United States Patent
Zimmer

(10) Patent No.: US 6,910,243 B1
(45) Date of Patent: Jun. 28, 2005

(54) APPARATUS FOR SECURING A WIPER ARM

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/674,103

(22) PCT Filed: Oct. 13, 1999

(86) PCT No.: PCT/DE99/03285

§ 371 (c)(1),
(2), (4) Date: Oct. 26, 2000

(87) PCT Pub. No.: WO00/53468

PCT Pub. Date: Sep. 14, 2000

(30) Foreign Application Priority Data

Mar. 8, 1999 (DE) .......................................... 199 10 118

(51) Int. Cl.[7] ................................................ B60S 1/34
(52) U.S. Cl. ................ 15/250.31; 15/250.3; 15/250.23; 403/71
(58) Field of Search .............................. 403/52, 53, 66, 403/79, 71, 119; 15/250.21, 250.23, 250.3, 250.31

(56) References Cited

U.S. PATENT DOCUMENTS 5,621,943 A     4/1997   Berge

FOREIGN PATENT DOCUMENTS

| DE | 44 28 371 A | 2/1996 |
|----|-------------|--------|
| DE | 198 24 640 A | 12/1998 |
| WO | 99 10210 A | 3/1999 |
| WO | 00/53468 | 9/2000 |

Primary Examiner—Robert J. Warden, Sr.
Assistant Examiner—Laura C Cole
(74) Attorney, Agent, or Firm—Michael J. Striker

(57) ABSTRACT

The invention relates to an apparatus for securing a wiper arm, which is driven via a lever mechanism (10) that has a drive lever, connected in a manner fixed against relative rotation to the drive shaft (12), and a steering lever (22, 24, 26) connected to an axle (16, 18, 20), which are pivotably connected to a wiper lever (112).

It is proposed that the steering lever (22, 24, 26) is braced in the mounting direction (28) on a bearing shoulder (30, 32, 34) on the axle (16, 18, 20).

14 Claims, 6 Drawing Sheets

APPARATUS FOR SECURING A WIPER ARM

BACKGROUND OF THE INVENTION

The invention is based on an apparatus for securing a wiper arm.

Wiper systems with a plurality of windshield wipers for motor vehicles are secured with their wiper bearings directly or indirectly via a mounting tube to the body of the motor vehicle. The mounting tube carries a wiper drive mechanism with a wiper motor, whose motor shaft, via a rod assembly, drives cranks that are solidly connected to one end of a drive shaft for each windshield wiper.

At least one radial bearing is provided in the bearing housing, and an axial bearing is provided on the face ends between the bearing housing and a part solidly connected to the drive shaft. The drive shaft protrudes from the vehicle body and moves a wiper arm, connected to it, with a wiper blade over a windshield. In order to adapt a wiping surface swept by the wiper blade favorably to a shape of the windshield, it is known to drive the wiper arm via a lever mechanism. As a rule, the lever mechanism has a drive lever secured to the drive shaft and a steering lever supported on an axle, and these levers are pivotably connected to a wiper lever connected to the wiper arm.

From German Patent Disclosure DE 44 28 371 A1, a shaft hub connection of a wiper is known, in which the drive shaft has a cross-sectional region that deviates from radial symmetry and also has a bearing shoulder. Placed between the drive shaft and the fastening part is a pressure piece, which has an opening that even before assembly is embodied to suit the cross-sectional region deviating from radial symmetry and which positively surrounds the drive shaft. The pressure piece also has an outer cone, with which it is pressed via a separable fastening element on the drive shaft into a suitably shaped inner cone of the fastening part. The fastening part is pressed onto the bearing shoulder by the fastening element via the pressure piece and fixed in the longitudinal direction of the shaft.

In the proposed embodiment, production variations have only slight influence on the precision of positioning of the wiper arm. The wiper arm can be secured with a high tightening moment, without influencing the positioning precision of the wiper arm.

SUMMARY OF THE INVENTION

According to the invention, the steering lever of a lever mechanism is braced in the mounting direction on a bearing shoulder on the axle. The steering lever is supported in the axial direction at a defined point. Production variations of the steering lever and the axle have only a slight effect on the position of the steering lever relative to the axle. Without affecting the precision of positioning, the steering lever can be secured by a fastening element with a high axial force on the bearing shoulder. By means of a precise position of the steering lever on the axle, stresses and wear in the lever mechanism can be reduced. Especially advantageously, not only the steering lever but also the drive lever is braced in the mounting direction on a bearing shoulder on the drive shaft. The drive lever and the steering lever can be secured on the drive shaft and the axle in the axial direction at precise positions adapted to one another. Undesired differences in height between the drive lever and the steering lever and stresses can be avoided.

The steering lever can be braced directly on the bearing shoulder, or advantageously via a disk. With a disk, the diameter of the axle can be made smaller, and thus the axle can be more economical. The steering lever can also advantageously be supported on a large area, which reduces the load on the steering lever from a tilting moment. Braced on the disk at the bearing point with the axle, the steering lever can be made thinner, lighter in weight, and less expensive.

The windshield wiper system with the drive shafts and the axles is as a rule furnished separately from the lever mechanism and the wiper arm to an auto manufacturer. In one feature it is proposed that the disk be pressed nonpositively onto the axle, for instance by a press fit, a conically extending axle, and/or a chamfer. The disk is connected in captive fashion to the windshield wiper system and need not be shipped separately. Furthermore, the disk can be positioned and oriented accordingly in the manufacture of the wiper system. As a result, the steering lever can be mounted quickly and exactly on the disk by the vehicle manufacturer.

To obtain an unambiguous bearing point, the steering lever is connected to a pivotable axle in a manner fixed against relative rotation. As a rule, the steering lever is secured to the axle with a nut. The steering lever and the axle should therefore already be connected in a manner fixed against relative rotation upon assembly, to prevent joint rotation of the axle during assembly. The effect of torque between the axle and the steering lever is created on the one hand by the friction of the axle in its bearing point and on the other by the tightening and loosening of the nut and is less than the drive moment. Advantageously, the connection, fixed against relative rotation, between the axle and the steering lever is designed for the low torque to be transmitted and as a result can be made smaller, lighter in weight, and less expensive. This is attained with an embodiment according to the invention in which a rotationally fixed connection between the steering lever and the axle is established via the disk. An effective tilting moment can be supported via the disk, and the low effective torque can be transmitted via a short axial connection, thus economizing in terms of both axial structural length and weight.

Advantageously, a nonpositive engagement is utilized between the axle and the disk, and a positive engagement is utilized between the disk and the steering lever. The shaft can be embodied rotationally symmetrically and economically, and the disk is secured in captive fashion. With a positive engagement between the disk and the steering lever, the steering lever is already fixed in a manner fixed against relative rotation even once it is placed on the disk and can be mounted in a simple way. By its contact with the disk, the steering lever is unambiguously defined in terms of its position. To avoid an overdefined bearing of the steering lever, the disk and the steering lever are connected in the pivoting direction via a clearance fit.

A structurally simple, space-saving positive engagement is attained with side walls of the steering lever that positively surround the disk in the pivoting direction, specifically with a cross-sectional region deviating from radial symmetry, for instance with one or more flat faces on the steering lever and on the disk. Furthermore, the force to be transmitted is advantageously introduced from the steering lever to the disk over a large radius, so that only small forces act on the steering lever.

To facilitate mounting the side walls on the disk, it is proposed that the side walls be embodied as merging in the mounting direction, with a smaller cross-sectional region deviating from radial symmetry, to a larger, preferably round cross-sectional region. The steering lever can advantageously, in a first mounting step, be positioned with the larger, round cross-sectional region on the disk, and in a second mounting step, by rotation of the steering lever or of the disk with the axle, it can be made to rest with the cross-sectional region deviating from radial symmetry above the disk, so that the side walls and the disk can mesh with one another positively in the pivoting direction. This makes simple, fast assembly of the steering lever possible.

Besides the connections proposed, the steering lever and the disk, and the disk and the axle, can each be connected with one another in the pivoting direction nonpositively and/or positively. Especially a purely positive connection in the pivoting direction between the disk and the axle can be advantageous, if after the windshield wiper system has been mounted on a vehicle body a component, such as a scuttle cover, has to be mounted on the axle behind the disk in terms of the mounting direction. Without a premounted disk, the component can simply be mounted on the axle with a small opening and possibly sealed off. Next, the disk can be mounted in the pivoting direction positively, with or without a slight nonpositive engagement.

In one feature, instead of being connected via the disk, the steering lever is connected directly to the axle in a manner fixed against relative rotation, and specifically the axle advantageously has a cross-sectional region deviating from radial symmetry, which is for instance polygonal, elliptical, etc., and which positively surrounds the steering lever. A connection between the side walls of the steering lever and the disk can be dispensed with, and the disk can be smaller or even omitted. Furthermore, premounting of the disk and a captive securing means can be dispensed with, making it possible not to mount the disk alone but instead to mount it along with the lever mechanism, for instance after a scuttle cover has been installed. The positive engagement in the pivoting direction between the steering lever and the axle can be attained by means of one or more flat faces on the axle or by means of an elliptical cross-sectional area of the axle and a correspondingly embodied opening in the steering lever.

In one feature of the invention, the drive shaft has a cross-sectional region deviating from radial symmetry. Placed between the drive shaft and the drive lever is a pressure piece, which has an opening corresponding to the cross-sectional region deviating from radial symmetry and positively surrounds the drive shaft in the pivoting direction. The pressure piece is pressed by a separable fastening element, such as a nut, with an outer cone into an inner cone of the drive lever and fixed with the drive lever on the bearing shoulder. The drive lever is positioned exactly on the bearing shoulder in the axial direction. The pressure piece is connected in the pivoting direction to the drive shaft via a positive engagement, preferably via from one to twelve large, load-bearing faces, for instance via a hexagon or an elliptical cross-sectional area, and as a result can easily be pulled off together with the drive lever from the drive shaft, or dismantled. To support the pressure piece and in particular the drive lever on the drive shaft without play, in one feature the cross-sectional region of the drive shaft, deviating from the radial symmetry, is embodied at least in one region in the mounting direction with an increasing diameter, onto which the pressure piece can be fixed without play by nonpositive engagement. When the pressure piece is slipped on, a larger inside diameter of the pressure piece also first meets a smaller outside diameter of the drive shaft, making it easy to install the pressure piece.

If the steering lever, like the drive lever, is connected to the axle via a pressure piece, then this lever is positioned exactly in the axial direction on the axle and can easily be pulled from the axle along with the pressure piece. Furthermore, with the same kind of securing of the drive lever on the drive shaft and of the steering lever on the axle, the number of different components and production costs are reduced.

Only a low torque acts between the steering lever and the axle, and thus the steering lever can advantageously be embodied as a sheet-metal part. Especially in the case of the rotationally fixed connection of the steering lever and the axle via the disk, the torque is transmitted over a large radius by a positive engagement, and the tilting moment on the disk is supported via a large area, each of which contributes to a lesser load on the steering lever and argues for the embodiment of the steering lever as a sheet-metal part. Also in the embodiments according to the invention, a cone that widens in the mounting direction can be avoided, and the steering lever can advantageously be manufactured from one side and one or more deep drawing operations. With a steering lever embodied as a sheet-metal part, economies of weight, production effort, and expense can be achieved.

To increase the rigidity of the steering lever in the region of the connection point to the axle, the steering lever in one feature has a cup-shaped indentation in this region in a cap side.

BRIEF DESCRIPTION OF THE DRAWING

Further advantages will become apparent from the following drawing description. Exemplary embodiments of the invention are shown in the drawing. The drawing, description and claims include numerous characteristics in combination. One skilled in the art will expediently consider the characteristics individually as well and put them together to make useful further combinations.

Shown are.

DESCRIPTION OF THE PREFERRED EMBODIMENTS

Figure 1:
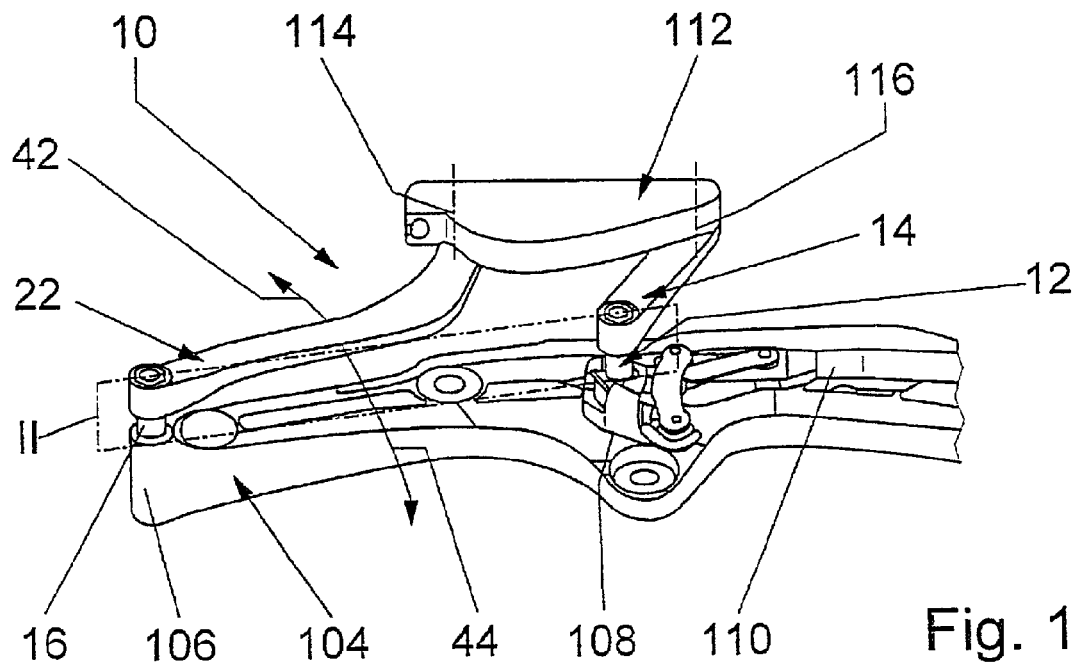
FIG. 1, a detail of a windshield wiper system with a lever mechanism.

FIG. 1 shows a detail of a wiper system for a motor vehicle, whose wiper bearings 106, 108 are secured via a mounting tube 104 to a body of the motor vehicle. The mounting tube 104 carries a wiper drive mechanism, not identified by reference numeral, which via a rod assembly 110 drives a drive shaft 12. The drive shaft 12 is radially and axially supported in the wiper bearing 108, protrudes from the body, and moves a drive lever 14, secured to its free end, of a lever mechanism 10. Besides the drive lever 14, the lever mechanism 10 has a steering lever 22, which is supported in the wiper bearing 106 via a pivotable axle 16, and a wiper lever 112, which is pivotably connected to the drive lever 14 and the steering lever 22 via two bearings 114 and 116. The wiper lever 112 moves a wiper arm, secured to it and not shown in further detail, with a wiper blade over a windshield.

Figure 2:
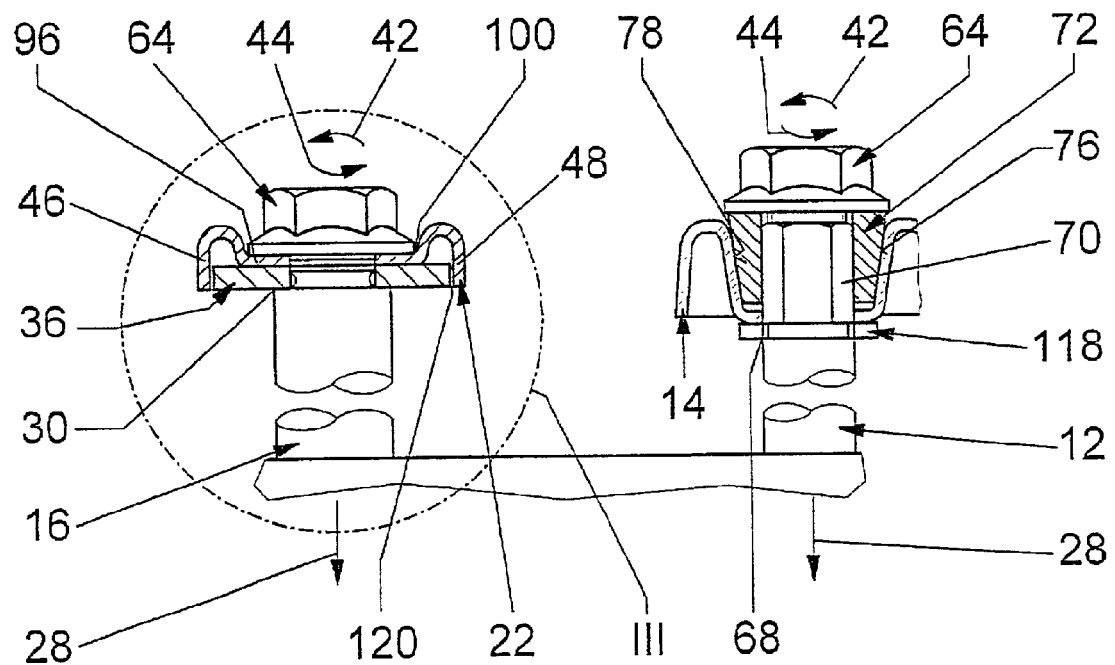
FIG. 2, a section taken along the plane II in FIG. 1.

Accordingly to the invention, the steering lever 22 and preferably the drive lever 14 are braced in the mounting direction 28 via a disk 36, 118 on a bearing shoulder 30, 68 on the axle 16 and the drive shaft 12, respectively (FIG. 2). The drive lever 14 and the steering lever 22 can be secured on the drive shaft 12 and axle 16, respectively, in the axial direction at precise positions adapted to one another. Undesired differences in height between the drive lever 14 and the steering lever 22 and stresses in the wiper bearings 106, 108 and the bearings 114, 116, and resultant wear, can be avoided.

Figure 3:
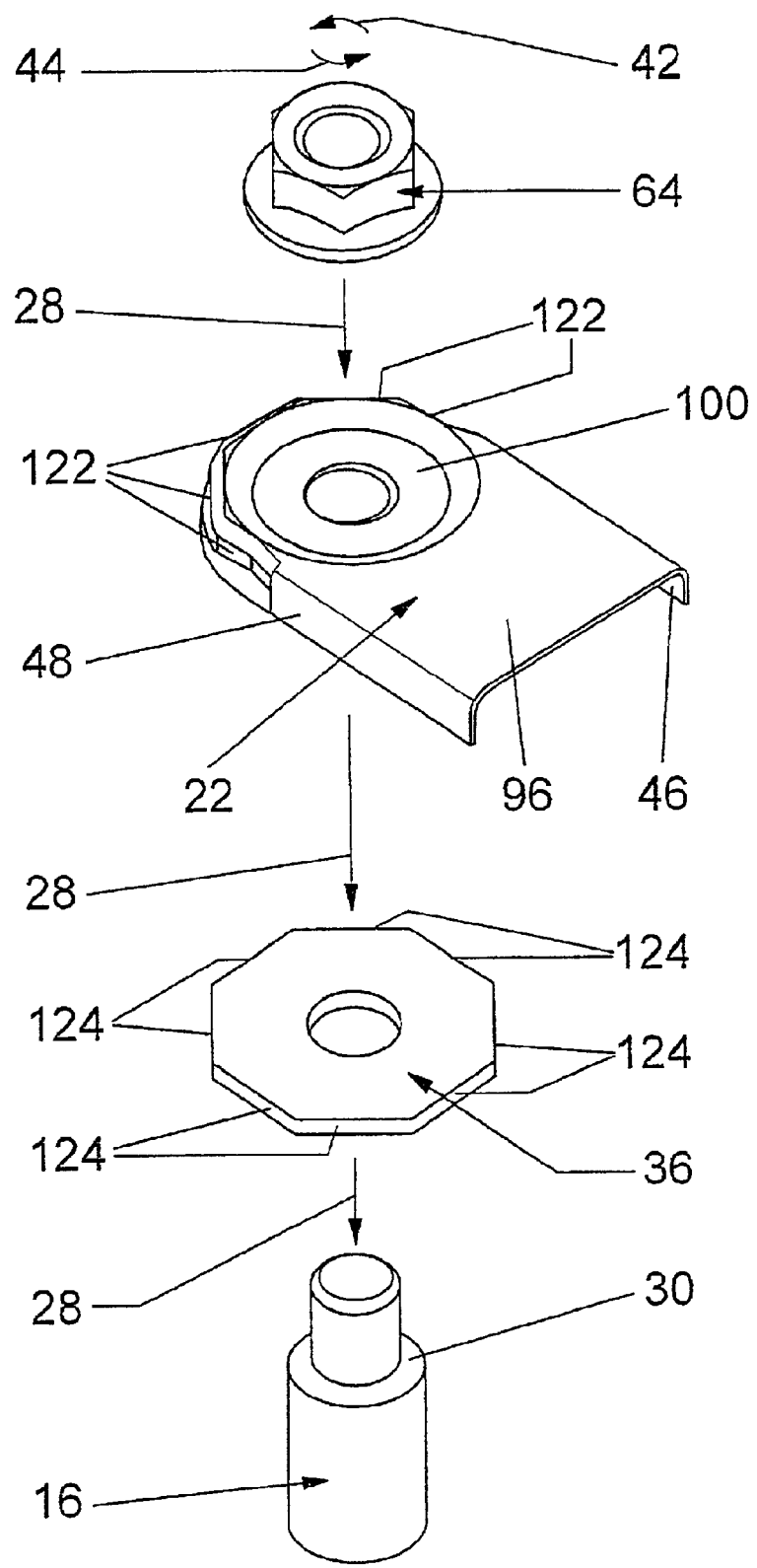
FIG. 3, an exploded view of a detail III in FIG. 2.
Figure 4:
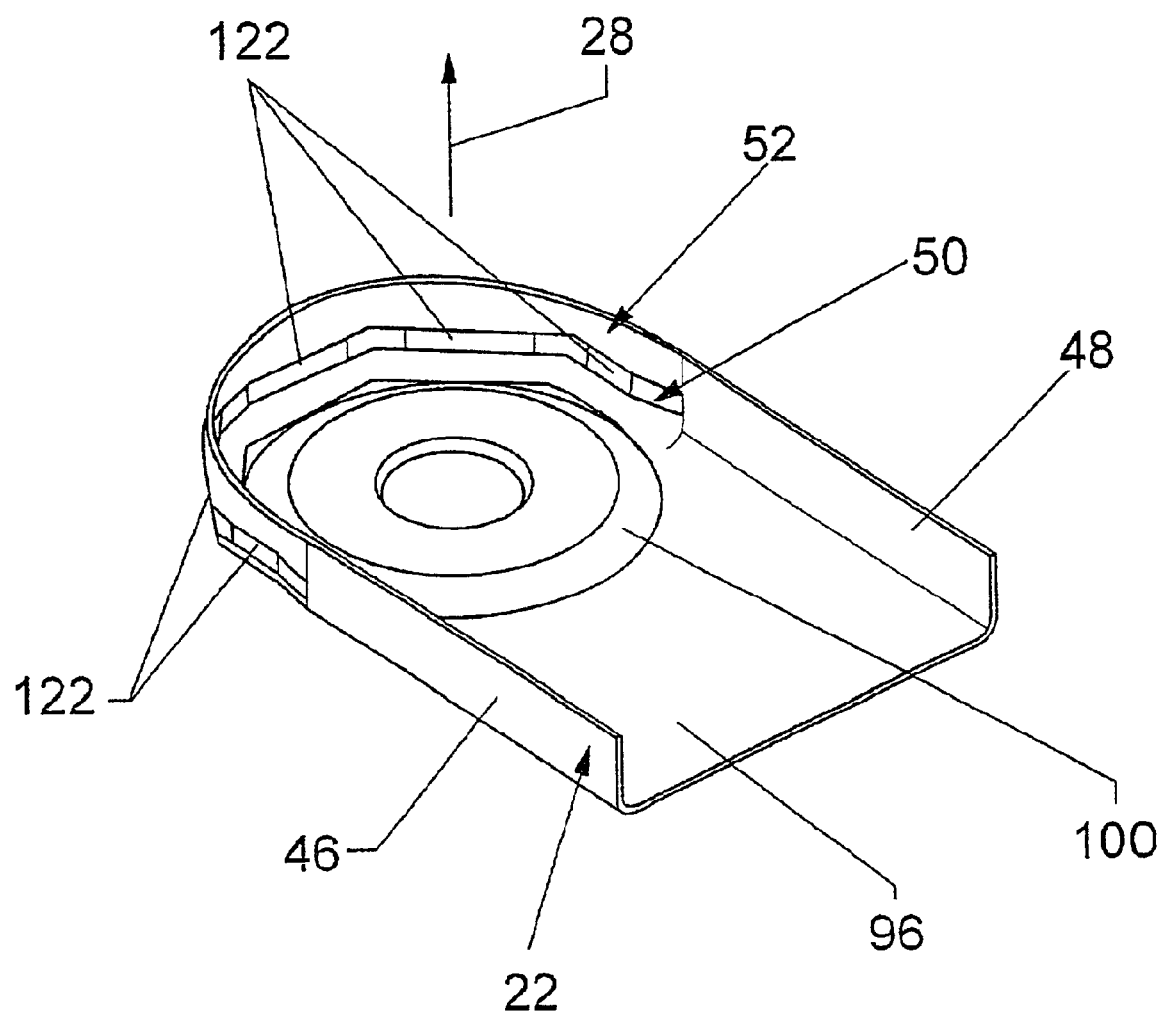
FIG. 4, a steering lever seen from below.

The disk 36 is pressed in captive fashion nonpositively onto the rotationally symmetrical axle 16 and is solidly connected to the axle 16 in the pivoting direction 42, 44. The steering lever 22, embodied as a sheet-metal part, is connected positively to the axle 16 in the pivoting direction 42, 44 via a clearance fit 120 via the disk 36, specifically with side walls 46, 48 that positively surround the disk 36 (FIGS. 2 and 3). To make assembly simpler, the side walls 46, 48 are embodied as merging in the mounting direction 28 from a smaller cross-sectional region 50 deviating from radial symmetry to a larger cross-sectional region 52 (FIG. 4). The steering lever 22 can advantageously be positioned in a first mounting step with the larger, round cross-sectional region 52 on the disk 36, and in a second mounting step, by rotation of the steering lever 22 or the disk 36 with the axle 16, it can be made to rest with the cross- sectional region 50 deviating from radial symmetry above the disk 36, so that the side walls 46, 48 and the disk 36 can mesh with one another positively in the pivoting direction 42, 44. The cross-sectional region 50 deviating from radial symmetry has flat faces 122, on which flat faces 124 of the disk 36 come to rest with positive engagement. The steering lever 22 is fixed in the axial direction on the bearing shoulder 30 by a nut 64 via the disk 36. By the positive engagement of the steering lever 22 with the axle 16 via the disk 36, the nut 64 can be tightened and loosened without causing the axle 16 to rotate with it. This makes fast, simple mounting and unmounting of the steering lever 22 possible.

Figure 5:
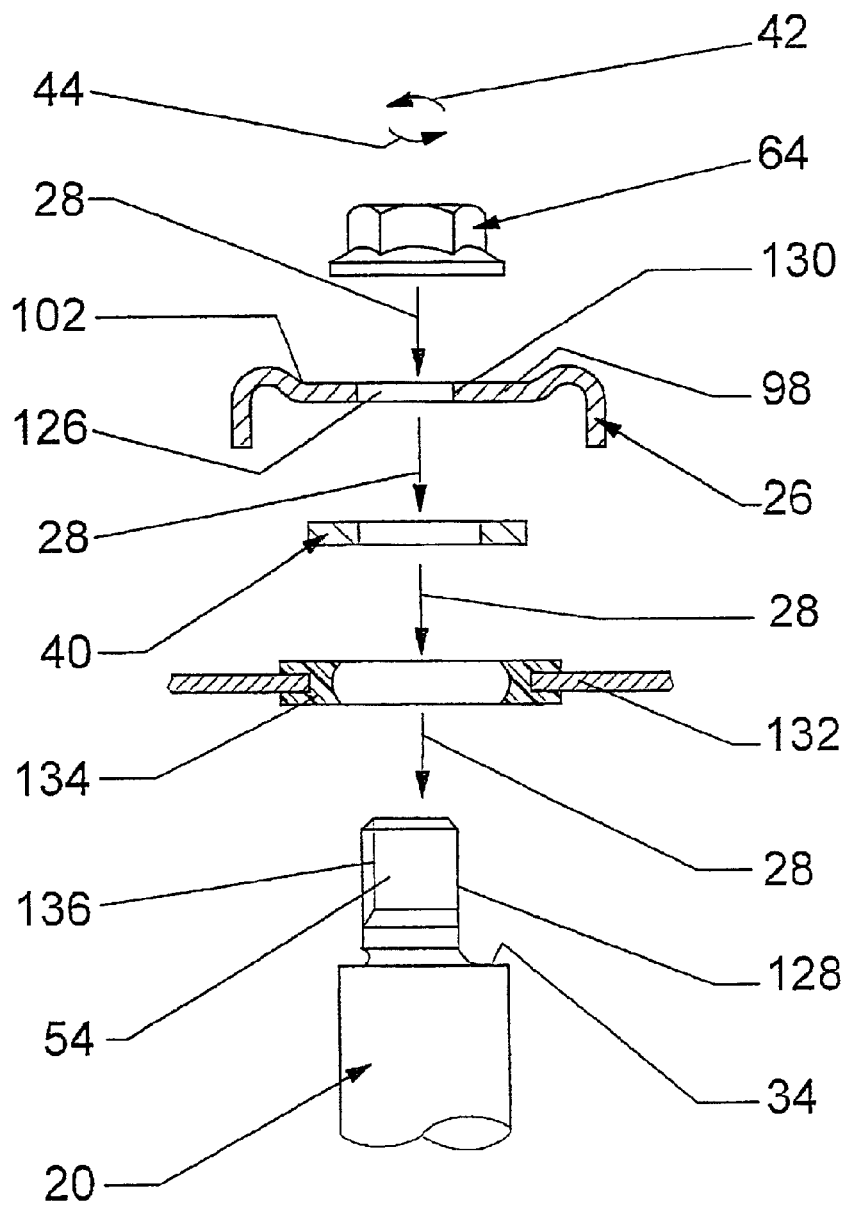
FIG. 5, a variant of FIG. 3.
Figure 6:
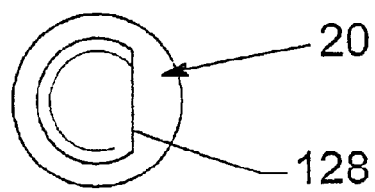
FIG. 6, an axle of FIG. 5 from above.
Figure 7:
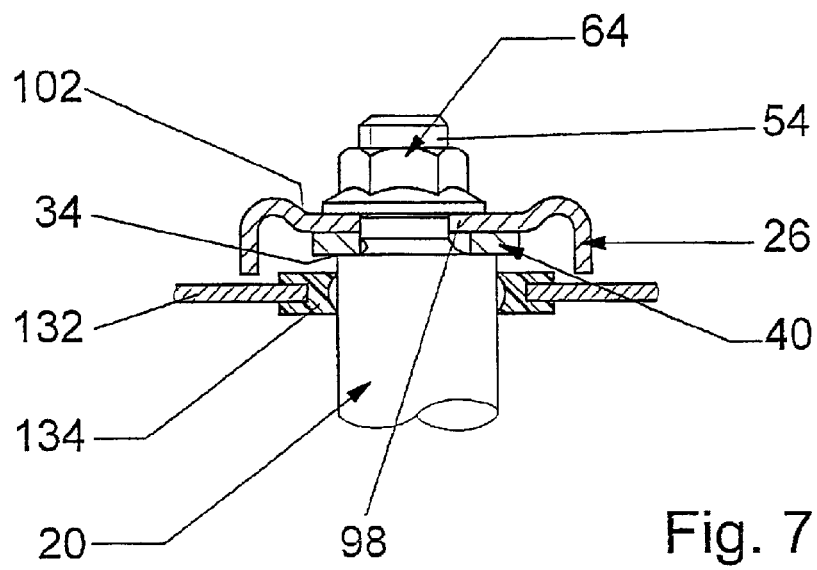
FIG. 7, an apparatus of FIG. 5 in the installed state.

In FIGS. 5, 6 and 7, instead of being connected via a disk 40, a steering lever 26 is connected in rotationally fixed fashion directly to an axle 20 below a thread 136, and specifically, the axle 20 has a cross-sectional region 54, deviating from radial symmetry, that positively surrounds the steering lever 26 in the pivoting direction 42, 44 with a suitably opening 126. The cross-sectional region 54, deviating from radial symmetry, of the axle 20 has a flat face 128, on which a flat face 130 of the opening 126 comes to rest. In the mounting process, first a scuttle cover 132 can be mounted with a seal 134 and then the disk 40 can be mounted, by way of which the steering lever 26 is braced on a bearing shoulder 34. Preassembly of the disk 40 can be dispensed with, and in comparison to the disk 36 in the exemplary embodiment of FIG. 3, the disk 40 can be made smaller. Like the steering lever 22, the steering lever 26 is fixed in the axial direction on the axle 20 with a nut 64.

To increase the rigidity of the steering levers 22, 26, embodied as sheet-metal parts, in the region of the connection point to the axle 16, the steering levers 22, 26 have a cup-shaped indentation 100, 102 (FIGS. 2, 3, 4, 5 and 7) in a cap side 96, 98.

Figure 8:
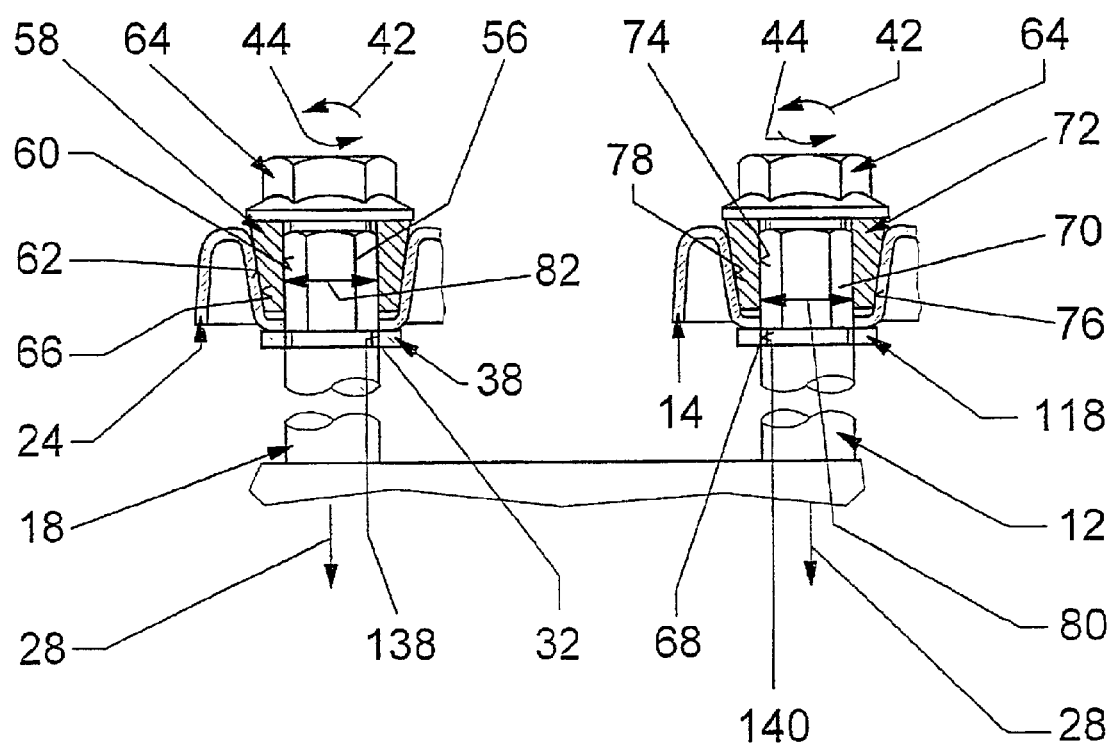
FIG. 8, a variant of FIG. 2.
Figure 9:
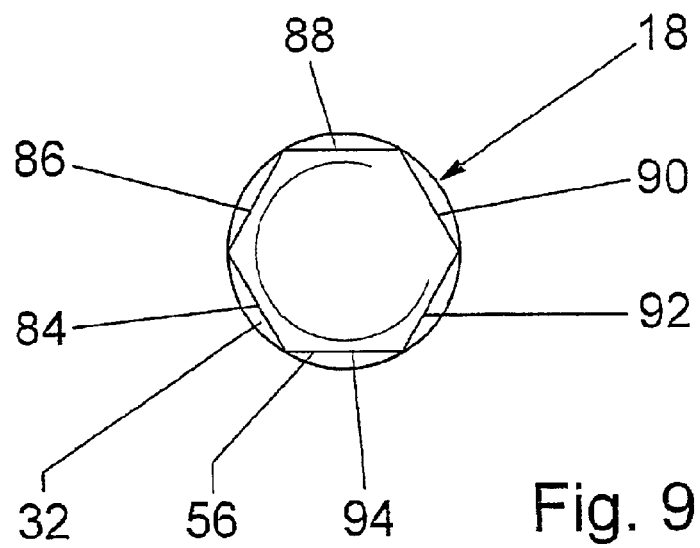
FIG. 9, an axle from above.
Figure 10:
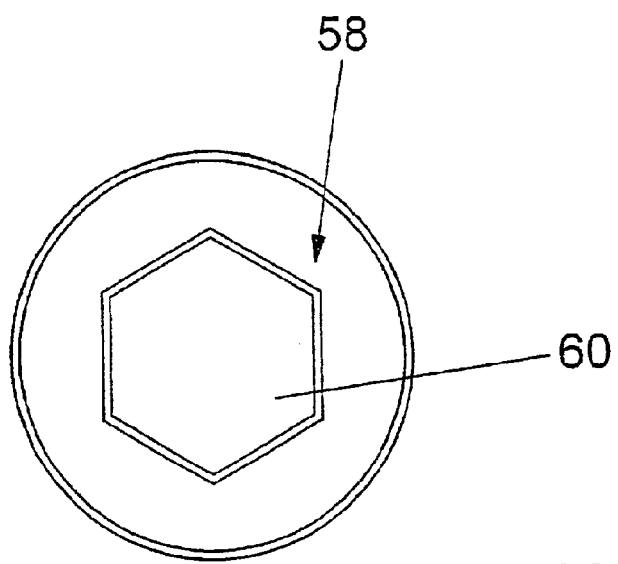
FIG. 10, a pressure piece from above.
Figure 11:
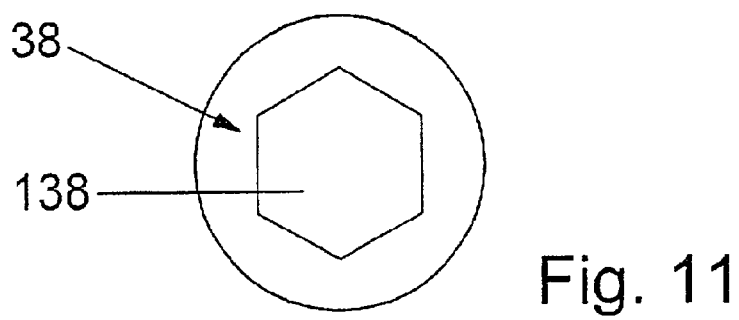
FIG. 11, a disk from above.

To reduce the number of different components, in the exemplary embodiment of FIG. 8 a connection of a steering lever 24 to an axle 18 is embodied like the connection of the drive lever 14 to the drive shaft 12. The drive shaft 12 and the axle 18 have a cross-sectional region 56, 70 (FIGS. 2, 8 and 9) that deviates from radial symmetry. Between the drive shaft 12 and the drive lever 14, and between the steering lever 24 and the axle 18, a respective pressure piece 58, 72 is placed, which has an opening 60, 74 (FIGS. 8 and 10) corresponding to the cross-sectional region 56, 70 deviating from radial symmetry and positively surrounds the drive shaft 12 and axle 18, respectively, in the pivoting direction 42, 44. The pressure piece 58, 72 is pressed by a nut 64 with an outer cone 62, 76 into an inner cone 66, 78 of the drive lever 14 and steering lever 24, respectively, and fixed thereby via a disk 38, 118 on a bearing shoulder 32, 68 (FIGS. 8 and 9). The disk 38, 118 has an opening 138, 140, embodied to suit the cross-sectional region 56, 70 deviating from radial symmetry, and these disks are pressed in captive fashion onto the axle 18 and the drive shaft 12, respectively. The pressure piece 58, 72 is connected in the pivoting direction 42, 44 to the drive shaft 12 and axle 18 via a positive engagement, specifically via six large, load-bearing faces 84, 86, 88, 90, 92, 94 of a hexagon (FIG. 9) and as a result can easily be pulled off or dismantled together with the lever 14, 24 from the drive shaft 12 and axle 18. In order to support the pressure piece 58, 72 and in particular the drive lever 14 and the steering lever 24 without play, the cross-sectional region 56, 70 deviating from radial symmetry is embodied with an increasing diameter 80, 82 in the mounting direction 28, onto which diameter the pressure piece 58, 72 can be fixed nonpositively without play.

What is claimed is:

1. An apparatus for securing a wiper arm, which is driven via a lever mechanism (10) that has a drive lever, connected in a manner fixed against relative rotation to a drive shaft (12), and steering lever (22, 24, 26) connected to an axle (16, 18, 20) for pivotal movement, which are pivotally connected to a wiper lever (112), characterized in that the steering lever (22, 24, 26) is braced in a mounting direction (28) on a bearing shoulder (30, 32, 34) on the axle (16, 18, 20), the steering lever (22, 24, 26) is braced on the bearing shoulder (30, 32, 34) via a disk (36, 38, 40) and the disk (36, 38) is in nonpositive engagement with the axle (16, 18) so that the disc (36, 38) and the axle (16, 18) do not overlap each other in a plane transverse to their axes in a pivotal direction about the axle, and in positive engagement with the steering lever (22, 24, 26) so that the disc (36, 38) and the steering lever (22, 24, 26) overlap each other in a plane transverse to their axes in a pivotal direction about the axle.

2. The apparatus of claim 1, characterized int hat the axle (20) has a cross-sectional region (54) deviating from radial symmetry, and the steering lever (26) positively surrounds the axle (20) in this region (54).

3. The apparatus of claim 1, characterized in that the axle (18) has a cross-sectional region (56) deviating from radial symmetry and having a pressure piece (58), placed between the axle (18) and the steering lever (24), which pressure place has an opening (60) embodied to suit the cross-sectional region (56) deviating from radial symmetry and positively surrounds the axle (18) and has an outer cone (62), with which it is pressed by a separable fastening element (64) on the axle (18) into an inner cone (66) of the steering lever (24) and is fixed jointly with the steering lever (24) in the axial direction on the bearing shoulder (32).

4. The apparatus of claim 3, characterized in that the cross-sectional region (56, 70) of the drive shaft (12), the axle (18) and both has an increasing diameter (80, 82), at least in one region in the mounting direction (28), and the pressure piece (58, 72) is fixed without play nonpositively on the cross-sectional region (56, 70).

5. The apparatus of claim 3, characterized in that the pressure piece (58, 72) and at least one element selected from the group consisting of the drive shaft (12), the axle (18) and both are connected positively via from one to twelve large, load-bearing faces (84, 86, 88, 90, 92, 94).

6. The apparatus of claim 1, characterized in that the drive lever (14) is braced in the mounting direction (28) on a bearing shoulder (68) on the drive shaft (12).

7. The apparatus of claim 6, characterized in that the drive shaft (12) has at least one cross-sectional region (70) having a pressure piece (72), placed between the drive shaft (12) and the drive lever (14), which pressure piece has an opening (74) embodied to suit the cross-sectional regional (70) deviating from radial symmetry and positively surrounds the drive shaft (12) and has an outer cone (76), with which it is pressed by a separable fastening element (64) on the drive shaft (12) into a suitably shaped inner cone (78) of the drive lever (14) and is fixed jointly with the drive lever (14) in the axial direction on the bearing shoulder (68).

8. The apparatus of claim 1, characterized in that the steering lever (22, 24, 26) is a sheet-metal part.

9. The apparatus of claim 8, characterized in that the steering lever (22, 26) in a cap side (96, 98) around the connection point with the axle (16, 20) has a cup-shaped indentation (100, 102).

10. An apparatus for securing a wiper arm, which is driven via a lever mechanism (10) that has a drive lever, connected in a manner fixed against relative rotation to a drive shaft (12), and a steering lever (22, 24, 26) connected to an axle (16, 18, 20) for pivotal movement, which are pivotally connected to a wiper lever (112), characterized in that the steering lever (22, 24, 26) is braced in a mounting direction (28) on a bearing shoulder (30, 32, 34) on the axle (16, 18, 20), the steering lever (22, 24, 26) is braced on the bearing shoulder (30, 32, 34) via a disk (36, 38, 40), the axle (16) is joined in the pivoting direction (42, 44) to the disk (46), and the disk (36) is joined by positive engagement to the steering lever (22) in the pivoting direction (42, 44) so that the disc (36, 38) and the axle (16, 18) do not overlap each other in a plane transverse to their axes in a pivotal direction about the axle and in positive engagement with the steering lever (22, 24, 26) so that the disc (36, 38) and the steering lever (22, 24, 26) overlap each other in a plane transverse to their axes in a pivotal direction about the axle.

11. The apparatus of claim 10, characterized in that the disk (36) and the steering lever (22) are connected in the pivoting direction (42, 44) via a clearance fit (120).

12. The apparatus of claim 10, characterized in that the steering lever (22) positively surrounds the disk (36) in the pivoting direction (42, 44) with side walls (46, 48).

13. The apparatus of claim 12, characterized in that the side walls (46, 48) in the mounting direction (28) deviate from a smaller cross-sectional region (50) to a larger cross-sectional region (52).

14. A wiper securing system, comprising a wiper arm, which is driven via a lever mechanism (10) that has a drive lever, connected in a manner fixed against relative rotation to a drive shaft (12), and a steering lever (22, 24, 26) connected to an axle (16, 18, 20) for pivotal movement, which are pivotally connected to a wiper lever (112), the steering lever (22, 24,26) is braced in a mounting direction (28) on a bearing shoulder (30, 32, 34) on the axle (16, 18, 20), the steering layer (22, 24, 28) is braced on the bearing shoulder (30, 32, 34) via a disk (36, 38, 40) and the disk (36, 38) is in non-positive engagement with the axle (16, 18) so that the disc (36, 38) and the axle (16, 18) do not overlap each other in a plane transverse to their axes in a pivotal direction about the axle and in positive engagement with the steering lever (22, 24, 26) so that the disc (36, 38) and the steering lever (22, 24, 26) overlap each other in a plane transverse to their axes in a pivotal direction about the axle.

* * * * *